Dec. 22, 1964    J. W. RICHARDS    3,162,478
VEHICLE UNDERBODY CONSTRUCTION
Filed Sept. 17, 1962    5 Sheets-Sheet 1
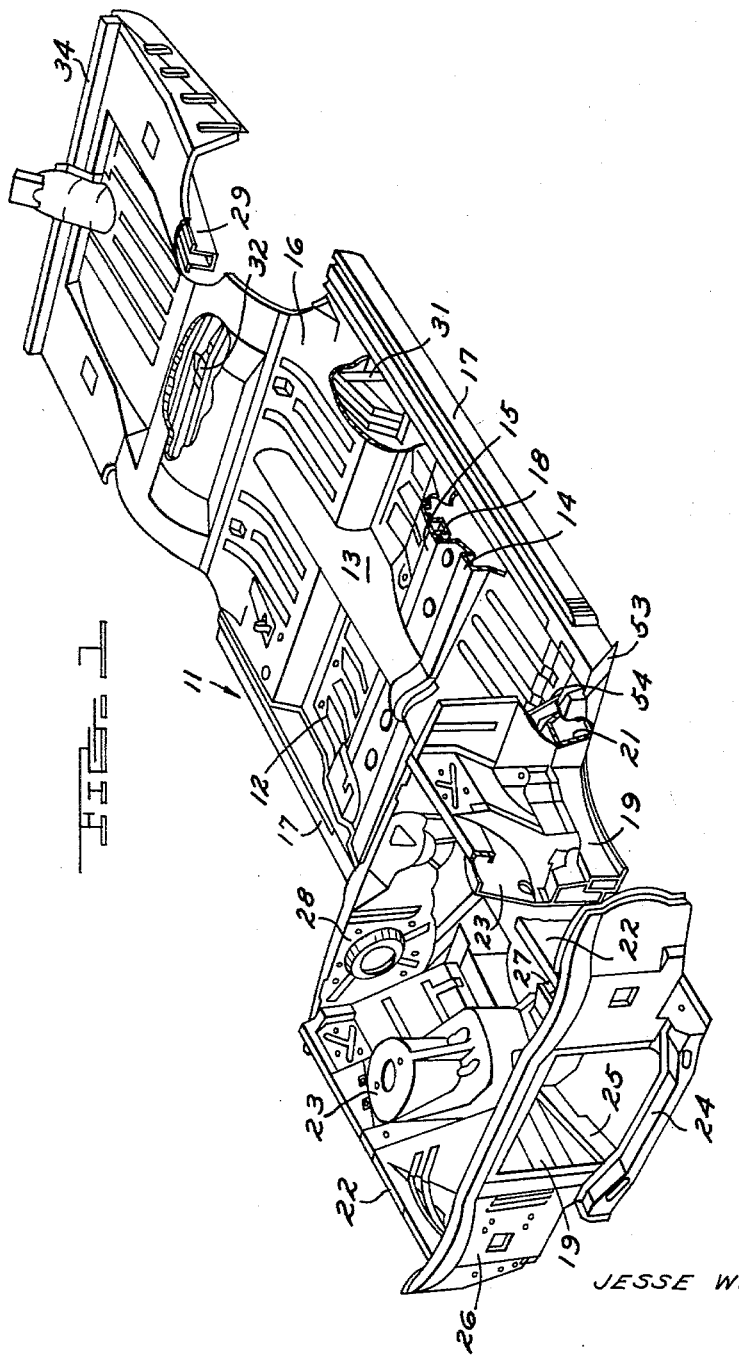
JESSE W. RICHARDS
INVENTOR.
BY *John R. Faulkner*
*John J. Roethel*
ATTORNEYS

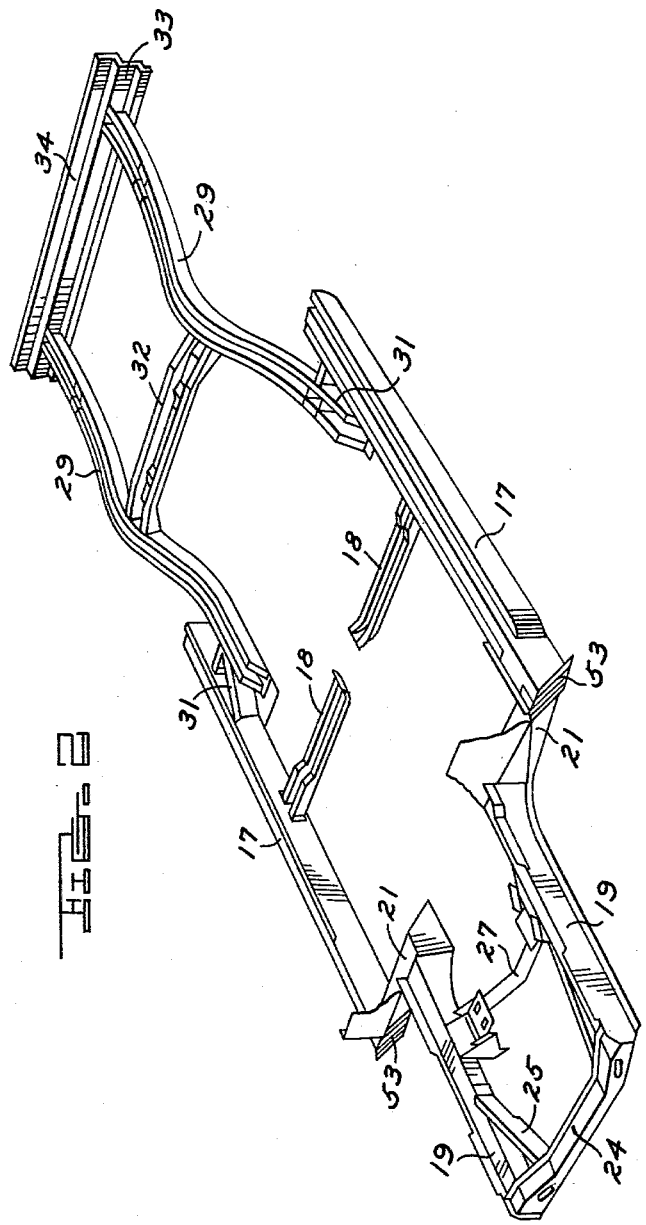

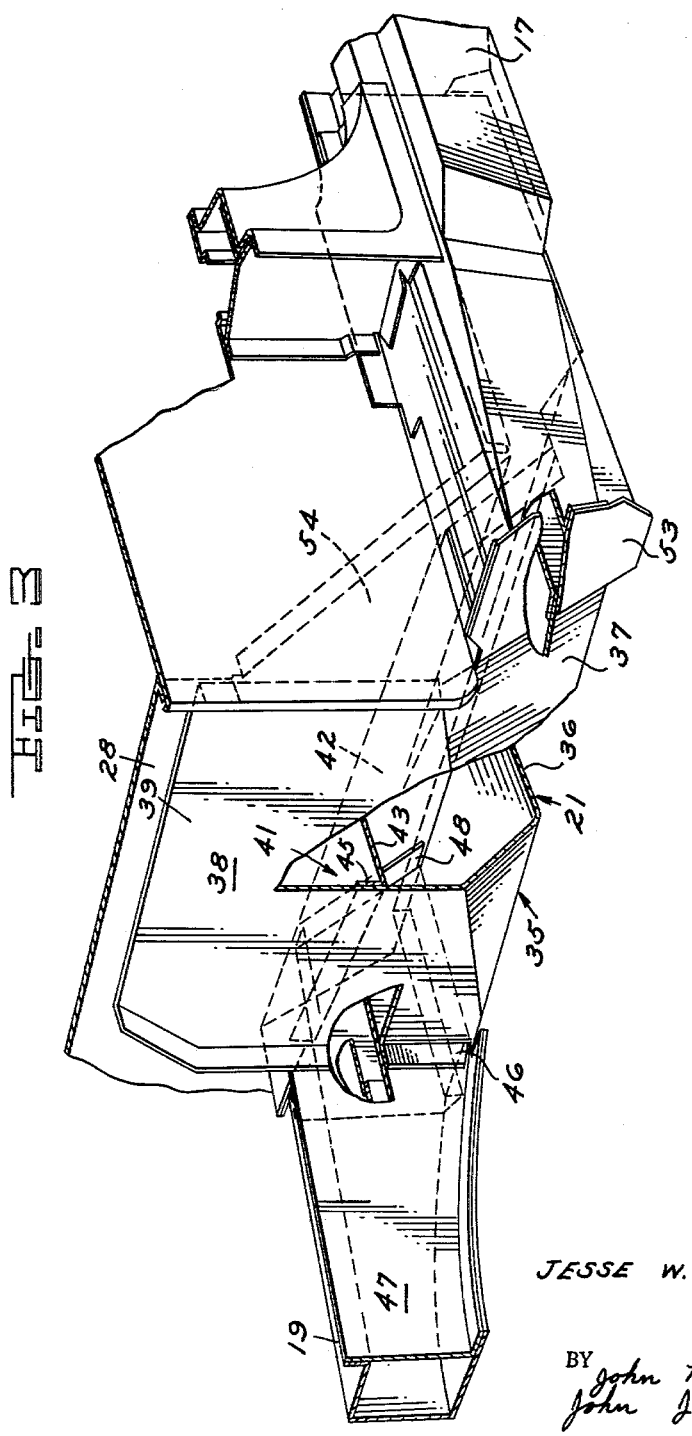

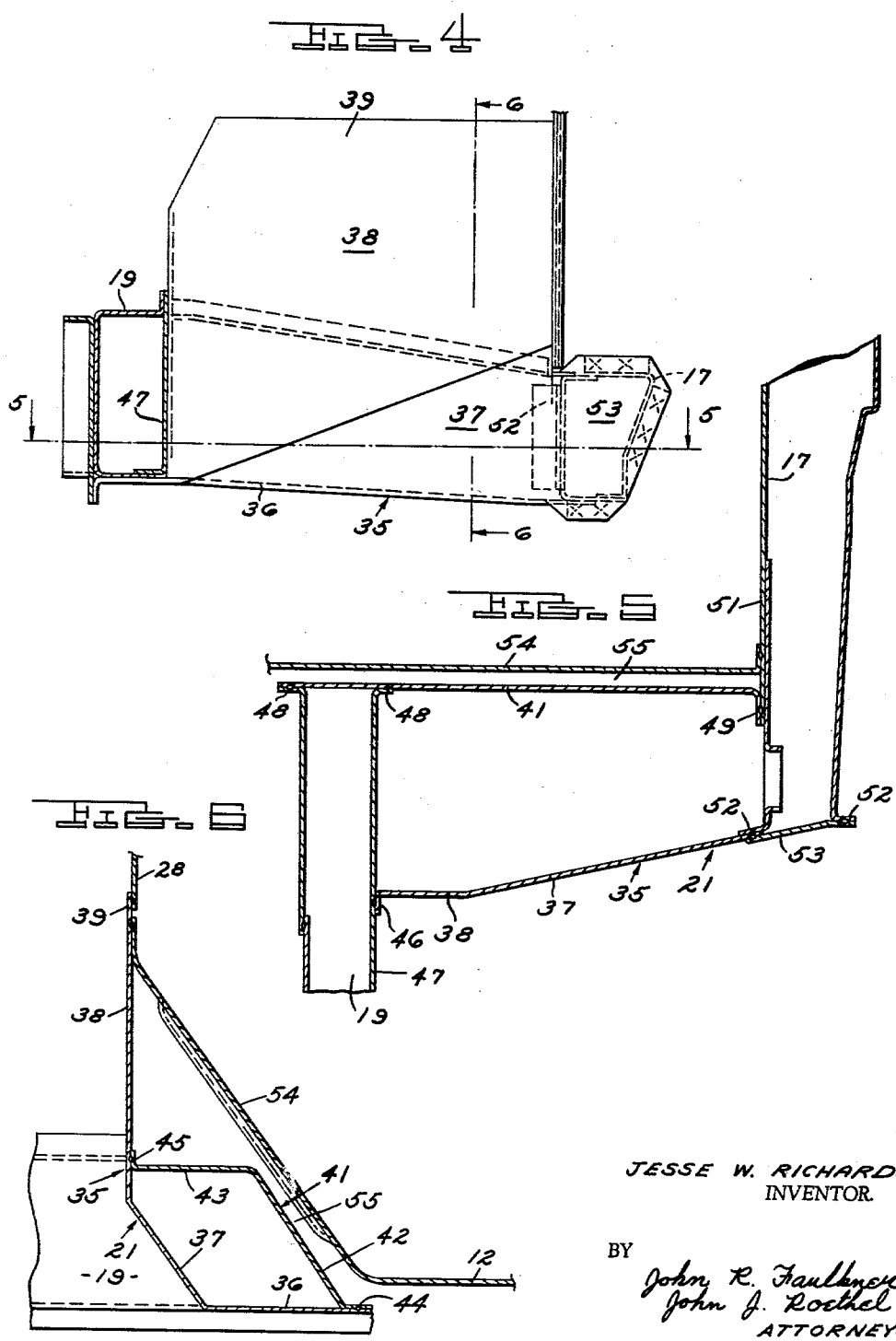

Dec. 22, 1964    J. W. RICHARDS    3,162,478
VEHICLE UNDERBODY CONSTRUCTION
Filed Sept. 17, 1962    5 Sheets-Sheet 5
FIG. 7
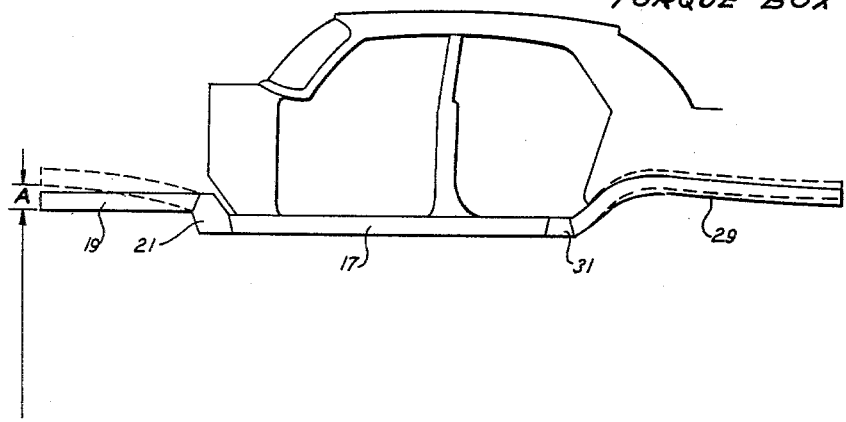
UNITIZED STRUCTURE
WITH ISOLATED
TORQUE BOX
SAME TOTAL
DEFLECTION
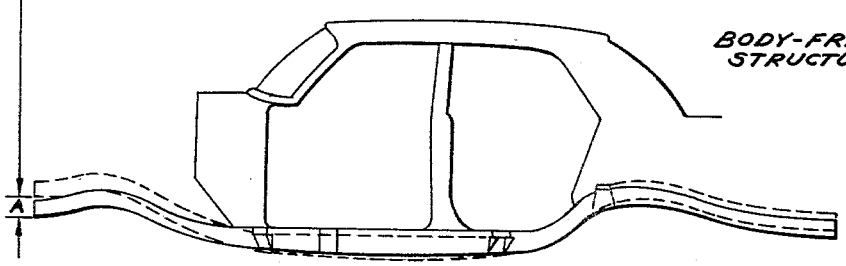
BODY-FRAME
STRUCTURE
JESSE W. RICHARDS
INVENTOR.
BY John R. Faulkner
John J. Roethel
ATTORNEYS

United States Patent Office 3,162,478
Patented Dec. 22, 1964

3,162,478
VEHICLE UNDERBODY CONSTRUCTION
Jesse W. Richards, Dearborn, Mich., assignor to Ford Motor Company, Dearborn, Mich., a corporation of Delaware
Filed Sept. 17, 1962, Ser. No. 224,042
8 Claims. (Cl. 296—28)

This invention relates generally to underbody structures for motor vehicles.

Most motor vehicles manufactured may be categorized as having a separate body-on-frame construction or as having a fully unitized (frameless) construction. To provide the fine riding qualities demanded for passenger carrying vehicles, either type of construction must have a built-in characteristic known as structural compliance, that is, an ability to absorb road shocks that come through the suspension system before such shocks can be transmitted to the passenger compartment.

Structural compliance may be obtained in body-on-frame vehicles somewhat easier than in unitized (frameless) body vehicles. The separate body-on-frame construction has a continuous structural frame which, in response to road shocks, deflects as a unit or integral beam. The body is attached to the frame by rubber body mounts which isolate the body from the frame and permit the body openings to remain dimensionally stable even though the structural frame as a whole is deflecting.

The conventional fully unitized or frameless construction, which frequently is constructed according to the monocoque principle, depends on the body panels for its rigidity and on rigid body sills for dimensional stability of the body openings. Compliance must be achieved in the front and rear structural rails outside the confines of the body sills.

The present invention adds to the body and frame construction and to the conventional, fully unitized construction a third and unique category of vehicle construction which may be designated the integral frame-body combination. The unique underbody structure embodied in this construction assures body rigidity, provides strong structural support around the passenger compartment area, and permits a high degree of structural compliance. In this construction the body support is formed of heavy gauge, box section side sills and cross members which are welded to the floor pan. The junction of the body support with the front rails is accomplished through torque boxes.

Although the use of torque boxes in vehicle frame construction is not new, the integral frame-body construction of the present invention employs a novel design principle which is embodied as an "Isolated Torque Box Structure." The isolated torque box is isolated in a sense that it is not integrally a part of the integrated body structure dash panel or toeboard. The isolated torque box, one for each side of the integral frame-body, runs from the body sill laterally inboard to the front rail, so that vertical deflection of the front rail is accommodated by twisting or torsional deflection of the torque box between the front rail and the body sill structure, without causing transmission of the road shock through the floor pan and into the passenger compartment of the vehicle.

One advantage of the isolated torque box construction and arrangement is that the gauge and dimensions of the torque box can be so varied with each vehicle model as to obtain the degree of compliance that is most compatible with the balance of the vehicle structure.

Other objects, features and advantages of the present invention will appear in the following description and appended claims, reference being had to the accompanying drawings, in which:

FIG. 1 is a perspective view illustrating a vehicle underbody construction in accordance with the present invention;

FIG. 2 is a perspective view of the vehicle underbody with the superstructure removed to bring out the frame-like characteristics of the integral frame-body construction;

FIG. 3 is an enlarged perspective view of a portion of the underbody construction illustrating the isolated torque box;

FIG. 4 is a front elevation of FIG. 3;

FIGS. 5 and 6 are sectional views taken along the lines 5—5 and 6—6 of FIG. 4, respectively; and FIG. 7 is a schematic view comparing the front rail deflection obtainable with an integrated frame-body construction embodying the present invention with that of a conventional body-on-frame construction.

Referring now to the drawings, the underbody, generally designated 11, embodying the present invention comprises a body compartment floor pan 12. The floor pan 12 is a large sheet metal panel having a drive shaft tunnel 13 extending the full length of the pan and forming its central longitudinal structural reinforcing member. Lateral structural reinforcement is obtained from channel offsets, such as the forward offsets 14 and 15 and the rear offset 16. These offsets have the further function of providing platforms for the passenger compartment seats (not shown). The floor pan is welded at each of its side edges to a heavy gauge, box section side sill 17. In addition to the reinforcement received from the channel offsets, the floor pan is structurally reinforced from the underside by channel shaped cross members 18 which extend laterally inwardly from the side sills and which are welded to the sills and to the floor pan.

The engine compartment area, which in FIGS. 1 and 2 of the drawing is shown forward of the passenger compartment area, is defined at its sides by spaced box section front rails 19, the front rails being equidistantly spaced on each side of the longitudinal center of the underbody and being substantially closer to each other than the side sills 17. The rear end portion of each front rail is coupled to the front end portion of the adjacent side sill by a torque box 21, the structural details of which will be hereinafter fully explained.

The engine compartment above the front rails is defined by fender aprons 22 which include wheel suspension system mounting towers 23. The fender aprons are welded to the front rails. A boxed front cross member 24 ties the front ends of the front rails together. Lateral stability at the front of the forward structure is provided by diagonal braces 25 which also carry the attachment for the front mounting points of the suspension lower arms (not shown). Across the front of the engine compartment structure is welded the radiator support assembly 26. This assembly anchors the front of the aprons through its own structural rigidity and its attachment to the front frame cross member. Lateral stability between the rails and the area of the suspension and front engine mount attachment is afforded by a bolted-in cross member 27. Completing the engine compartment structure is the dash panel 28 which is welded to the rearward ends of the aprons 22.

Although the structural features of the rear portion of the underbody are not involved in the present invention, these features will be described to present a complete description of the underbody. As most clearly seen from FIG. 2, the box section body sills are also connected to the rear rails 29 through torque boxes 31. However, the degree of freedom in the rear torque boxes is restricted relative to that achieved in the front since the rear torque boxes 31, the rear rails 29 and the floor pan 12 are welded together into an integral construction.

The rear rails 29 are inverted hat section members that are welded to the floor pan. Transverse rigidity is achieved by another inverted hat section member 32 running between the rails just forward of the kickup. This member 32 is also welded to the floor pan and it provides the upper attachment provisions for the rear shock aborbers (not shown). Tying in the ends of the rear rails is a Z member 33 adjacent to the lower back panel 34.

Reference is now made to FIGS. 3 to 6, inclusive, which exemplify structural details of the isolated torque box 21 embodied in the present invention. The views illustrate the left front junction between the portion of the underbody comprising the engine compartment and the portion of the underbody comprising the passenger compartment. It will be understood that the structure at the other side of the underbody is symmetrical.

As has been briefly described, the torque box 21 extends laterally inwardly from the front end portion of the box section side sill 17 to the rear end portion of the box section front rail 19. The torque box is fabricated of sheet metal and comprises a first sheet metal member 35 having a substantially planar section 36 forming the base of the box. The member 35 has an upwardly and forwardly inclined planar section 37 which forms the first or front wall of the box. This section diminishes in height from the side sills 17 toward the rail 19 so that when viewed from the front of the underbody 11 it has a substantially triangular appearance. The member 35 then has a substantially vertical planar section 38 which extends upwardly for a substantial distance above the front or first wall 37 and which is welded along its upper horizontal edge 39 to the dash panel 28.

A second sheet metal member 41 completes the box. This member has a substantially planar section 42 which is inclined upwardly and forwardly to form the second or rear wall of the torque box 21. The member 41 then has a substantially horizontally extending planar section 43 which forms the top wall of the torque box 21. At each edge extending lengthwise of the sheet metal member 41, the latter is provided with flanges 44 and 45 for welding to the sheet metal member 35.

The lateral ends of the torque box 21 are welded to the side sill 17 and to the front rail 19, the abutting sheet metal structures being provided with a variety of flanges and reinforcing plates through which the necessary welded joints are made. For example, as shown in FIG. 5, the section 38 of the sheet metal member 35 has a flange 46 which is welded to the outer wall 47 of the box section rail 19. The box section rail 19 terminates at its rear end in flanges 48 which are welded to an end portion of section 42 of the sheet metal member 41, this section 42 being long enough to extend across the rear end of the rail 19. The section 42 is provided at its outer end, the end abutting the side sill 17, with a vertical flange 49 which is welded to the inner side wall 51 of the side sill 17. The forward end of the side sill 17 terminates in the flanges 52, one of these flanges being welded to the outer vertical edge of the section 37 of the sheet metal member 35. An end or cover plate 53 is welded across the open end of the side sill 17.

It is believed that the foregoing brief description of several of the flanges and the method of assembling the various components together is sufficient for an understanding of the invention, since it will be understood that the attachment of the various components follows conventional practice in the construction of unitized vehicle bodies.

Referring now to FIG. 6, this cross-sectional view clearly illustrates an important feature of the present invention, that is, the manner in which the torque box 21 is isolated from the floor pan 12. As in most conventional body structures, whether of the separate body-on-frame type or of the fully unitized type, the floor pan 12 terminates at its forward end in a toeboard, herein designated 54. This toeboard 54 is tied in at its upper edge to panel portion 39 and through this portion to the dash panel 28. There is a substantial gap 55 between the rear wall 42 of the torque box 22 and the toeboard 54. This gap extends the full length of the torque box. The fact that this gap exists means that the torque box is isolated from direct contact with the floor pan and therefore that any reaction forces acting on the torque box which tend to deflect or twist the latter are absorbed through the side sill and not by transmission through the floor pan into the vehicle body.

To recapitulate, the front rail is attached to the inner end of the torque box which runs laterally outward from the front rail to the body sills. Because of this structural relationship of the front rail to the torque box, the front rails are permitted to deflect in much the same manner as the frame of a separate body-frame structure deflects. That is, as the front wheels of the vehicle move across uneven surfaces, the upward suspension reaction forces tend to lift the front rails at their free ends. Since the front rails are welded to the torque boxes, the tendency is for the boxes to twist or rotate about an axis extending transversely of the longitudinal axis of the underbody. The reaction forces resisting this twisting or rotating of the torque boxes are absorbed through the side sills and are not transmitted through the floor pan into the vehicle body.

FIG. 7 is presented to schematically illustrate that it is possible to obtain tuneable structural compliance in unitized vehicles similar to the compliance that is fundamental to the body-on-frame type vehicles. In both types of structures, it is necessary to limit deflections in the body side framing in order to preserve door opening dimensions. Since the body sills and rocker are a part of the door opening frame of either structure, and also serve as the principal structure of a unitized car, there is no opportunity to permit compliance in this area of unitized vehicle. The body-on-frame type of vehicle has the principal lower structure, the chassis frame, separated by resilient body mounts from the body sills and rockers; therefore, compliance of the principal structure can be permitted as illustrated in the lower half of FIG. 7. That is, the front portion of the frame may be permitted to deflect in a vertical direction as shown.

Through the present invention it is possible to duplicate the unique characteristics of body-on-frame vehicles in unitized vehicles through the use of the compliant members (the isolated torque boxes 21) between the front side rails and the body sills. These members can be thought of as shock absorbing compliant inserts in the unitized structure. They are located ahead of the body side framing, and thereby allow the use of rigid body side structures, yet provide for the absorption of shock through their compliance. By divorcing these complaint members or torque boxes from the toeboard area, none of their movement is transmitted into the floor of the vehicle and the same total deflection may be obtained as was obtained with the frame of the body-on-frame type vehicle.

It will be understood that the invention is not to be limited to the exact construction shown and described, but that various changes and modifications may be made without departing from the spirit and scope of the invention, as defined in the appended claims.

I claim:
1. A vehicle underbody assembly comprising:
laterally spaced, longitudinally extending sills defining the side perimeters of a passenger compartment portion of said underbody,
laterally spaced, longitudinally extending rails defining the side perimeters of a compartment portion of said underbody at one end of said passenger compartment portion and providing wheel suspension unit supports,
the sills being spaced laterally outwardly of the rails, torque box means extending laterally inboard from one end portion of each sill to an adjacent end portion of each rail, each torque box means being constructed and arranged to torsionally deflect about a transverse axis in response to wheel suspension unit reaction forces acting on each rail, respectively, and a floor panel connected at its lateral edges to said sills to form an integral structure therewith, said floor panel having an extension extending upwardly at an angle, a portion of said extension overlying each torque box means with an isolation space therebetween, said space isolating the torsional deflection of each torque box means from the adjacent portion of said extension and thereby inhibiting the transmittal to said floor pan through said extension of the reaction forces acting on each rail.

2. A vehicle underbody assembly comprising:

laterally spaced, longitudinally extending rails defining the side perimeters of an engine compartment portion of said underbody and providing front wheel suspension unit supports, laterally spaced, longitudinally extending sills defining the side perimeters of a passenger compartment portion of said underbody, the sills having greater lateral displacement than the rails and being displaced longitudinally rearwardly of the latter, torque box means extending laterally inboard from the front end portion of each sill to the rear end portion of each rail, each torque box means being constructed and arranged to torsionally deflect about a transverse axis in response to front wheel suspension unit reaction forces acting on each rail, respectively, and a floor panel welded at its lateral edges to said sills to form an integral structure therewith, said floor panel having a toeboard extending forwardly and upwardly at an angle, a portion of said toeboard overlying each torque box means with an isolation space therebetween, said space isolating the torsional deflection of each torque box means from the adjacent portion of said toeboard and thereby inhibiting the transmittal to said floor pan through said toeboard of the reaction forces acting on each rail.

3. A vehicle integral underbody structure comprising a body support section and an engine and wheel suspension support section:

said body support section comprising a floor pan, side sills integrally connected to said floor pan at the lateral edges of the latter, and cross members extending from said side sills beneath said floor pan, said cross members also being integrally connected to said floor pan and to said side sills;

said engine and wheel suspension support section comprising box section front rails, upstanding aprons welded to each front rail, said upstanding aprons including wheel suspension mounting towers, a front cross member tying the front ends of said front rails together, a radiator support assembly extending across the front ends of said aprons and above said front cross member, and a dash panel extending across the rear ends of said aprons;

and torque boxes running from the body support section side sills and attached to the rear ends of said front rails, said torque boxes being spaced from said dash panel and said floor pan, said torque boxes being adapted to twist or rotate about a lateral axis in response to wheel suspension reaction forces acting on said front rails, the spacing of said torque boxes from said dash panel and said floor pan preventing transmission of such reaction forces back through the vehicle.

4. A vehicle integral underbody structure comprising a body support section and an engine and wheel suspension support section:

said body support section comprising a floor pan having an upwardly and forwardly extending toeboard, side sills welded to said floor pan at the lateral edges of the latter, and cross members extending from said side sills beneath said floor pan, said cross members also being welded to said floor pan and to said side sills;

said engine and wheel suspension support section comprising box section front rails, upstanding aprons welded to each front rail, said upstanding aprons including wheel suspension mounting towers, a front cross member tying the front ends of said front rails together, a radiator support assembly extending across the front ends of said aprons and above said front cross member, and a dash panel extending across the rear ends of said aprons;

said toeboard being connected to said dash panel;

and torque boxes running from the body support section side sills and attached to the rear ends of said front rails, said torque boxes being spaced from said dash panel and said floor pan toeboard, said torque boxes being adapted to twist or rotate about a lateral axis in response to wheel suspension reaction forces acting on said front rails, the spacing of said torque boxes from said dash panel and said toeboard preventing transmission of such reaction forces back through said floor pan.

5. A vehicle integral underbody structure comprising a body support section and an engine and wheel suspension support section:

said body section comprising a floor pan having a toeboard extending forwardly and upwardly at an angle, box section side sills welded to said floor pan at the lateral edges of the latter, said engine and wheel suspension support section comprising box section side rails, upstanding aprons welded to each side rail, a box section cross member tying the front ends of said rails together, a radiator support panel extending across the front ends of said aprons and above said box section cross member, and a dash panel extending across the rear ends of said aprons and having said toeboard attached thereto at the upper end of the latter;

and torque boxes located beneath and in spaced relation to said toeboard and running from the body support section side sills to the rear ends of said front rails, said torque boxes being torsioned in response to wheel suspension reaction forces raising and lowering said front rails, the space between said torque boxes and said toeboard being effective to isolate one from the other and inhibit the transmission of such reaction forces through the vehicle.

6. A vehicle integral underbody structure comprising a body support section and an engine and wheel suspension support section:

said body section comprising an elongated floor pan having a toeboard extending longitudinally forwardly and upwardly at an angle, box section side sills welded to said floor pan at the lateral edges of the latter, and laterally extending cross members welded into place and extending beneath said floor pan from said side sills;

said engine and wheel suspension support section comprising longitudinally extending box section side rails terminating forwardly of said side sills, upstanding aprons welded to each front rail, a box section cross member tying the front ends of said rails together, a radiator support panel extending across the front ends of said aprons and above said box section cross member, and a dash panel extending across the rear ends of said aprons and having the upper edge of said toeboard attached thereto;

and torque boxes located beneath and in spaced relationship to said toeboard and attached to the front ends of said body support section side sills and to the rear ends of said side rails, said torque boxes in response to wheel suspension reaction forces raising and lowering said front rails being torsioned about a lateral axis, the space between said torque boxes and said toeboard being effective to isolate one from the other and inhibit the transmission of such reaction forces through said floor pan into the vehicle.

7. In a motor vehicle underbody structure:

a longitudinally extending box section sill, a longitudinally extending box section rail, and a transversely extending torque box connected at the ends thereof to said sill and rail, said sill and rail extending in opposite longitudinal directions from said torque box;

said torque box comprising a first sheet metal member having (a) a planar section forming the base of said box, (b) an inclined planar section forming a first wall of said box extending transversely of said sill and rail and diminishing in height from said sill toward said rail, and (c) a vertically extending planar section extending upwardly from said first wall and transversely of said sill and rail, and a second sheet metal member having (a) an inclined planar section forming a second wall of said box extending transversely of said sill and rail, and (b) a planar section forming the top wall of said box;

said second sheet metal member having flanges at each transverse edge thereof, said flanges being attached to said first sheet metal member at the transverse edge opposite the junction of said base forming section and said first wall and to the vertically extending section above said sill and rail.

8. In a motor vehicle underbody structure:

a longitudinally extending box section sill, a longitudinally extending box section rail, and a transversely extending torque box connected at the ends thereof to said sill and rail, said sill and rail extending in opposite longitudinal directions from said torque box;

said torque box comprising a first sheet metal member having (a) a substantially planar section forming the base of said box, (b) an inclined planar section forming a first wall of said box extending transversely of said sill and rail and diminishing in height from said sill toward said rail, and (c) a vertically extending planar section extending upwardly from said first wall and transversely of said sill and rail, and a second sheet metal member having (a) an inclined planar section forming a second wall of said box extending transversely of said sill and rail, and (b) a planar section forming the top wall of said box;

said second sheet metal member having flanges at each transverse edge thereof, said flanges being attached to said first sheet metal member at the transverse edge opposite the junction of said base forming section and said first wall and to the vertically extending section above said sill and rail, the ends of said torque box and the abutting portions of sill and rail being provided with flanges for integral attachment of the torque box to the sill and to the rail.

References Cited in the file of this patent

UNITED STATES PATENTS

| | | |
|---|---|---|
| 2,111,563 | Kliesrath | Mar. 22, 1938 |
| 2,645,519 | Stanfield et al. | July 14, 1953 |
| 2,935,335 | Muller et al. | May 3, 1960 |
| 2,964,331 | Sherman | Dec. 13, 1960 |
| 2,997,313 | Wall | Aug. 22, 1961 |

FOREIGN PATENTS

| | | |
|---|---|---|
| 728,111 | Germany | Nov. 20, 1942 |